US009766481B1

(12) United States Patent
Asfaw et al.

(10) Patent No.: US 9,766,481 B1
(45) Date of Patent: Sep. 19, 2017

(54) CLOSED LOOP AUDIO PROCESSING FOR BONE CONDUCTION TRANSDUCER

(71) Applicant: Google Inc., Mountain View, CA (US)

(72) Inventors: Michael Asfaw, Mountain View, CA (US); Chad Seguin, San Jose, CA (US); David Breece, III, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/230,748

(22) Filed: Aug. 8, 2016

(51) Int. Cl.
| | |
|---|---|
| H04R 3/00 | (2006.01) |
| H04R 29/00 | (2006.01) |
| G02C 11/06 | (2006.01) |
| H04R 1/02 | (2006.01) |
| G06F 3/16 | (2006.01) |
| H04R 3/04 | (2006.01) |

(52) U.S. Cl.
CPC .............. *G02C 11/06* (2013.01); *G06F 3/16* (2013.01); *H04R 1/028* (2013.01); *H04R 3/04* (2013.01); *H04R 29/001* (2013.01); *H04R 2460/13* (2013.01)

(58) Field of Classification Search
CPC . H04R 1/028; H04R 3/00; H04R 3/04; H04R 25/00; H04R 25/606; H04R 29/001; G06F 3/16; G02C 11/06
See application file for complete search history.

(56) References Cited

U.S. PATENT DOCUMENTS

| | | | |
|---|---|---|---|
| 4,985,925 A | 1/1991 | Langberg et al. | |
| 5,913,815 A | 6/1999 | Ball et al. | |
| 2012/0316454 A1* | 12/2012 | Carter | A61B 5/053 600/547 |
| 2013/0046131 A1 | 2/2013 | Ball et al. | |
| 2014/0270207 A1* | 9/2014 | Vinayak | H04R 3/002 381/59 |

OTHER PUBLICATIONS

Cortes, D., "Bone Conduction Transducers: output force dependency on load condition," Department of Signals and Systems, Chalmers University of Technology, Sep. 4, 2002.
Fynn, Mark C., et al., "Answering today's bone conduction hearing challenges with new signal processing solutions and wireless capabilities," Cochlear Baha 4 Sound Processor, Cochlear, Oct. 2013.

(Continued)

*Primary Examiner* — Thang Tran
(74) *Attorney, Agent, or Firm* — McDonnell Boehnen Hulbert & Berghoff LLP

(57) ABSTRACT

An example method may be performed by a wearable computing device (WCD) that includes a bone conduction transducer (BCT). The method includes providing, to the BCT, an input signal that represents audio content. The method further includes sensing a time-varying voltage of the input signal and a time-varying current of the input signal. The method further includes determining an operating mode based on the time-varying voltage and the time-varying current. The method further includes processing the audio content according to the determined operating mode and using the processed audio content to continue providing the input signal to the BCT.

20 Claims, 6 Drawing Sheets

(56) References Cited

OTHER PUBLICATIONS

Koch, Martin et al. "Examination of a Mechanical Amplifier in the Incudostapedial Joint Gap: FEM Simulation and Physical Model" Sensors (Basel, Switzerland) 14.8 (2014): 14356-14374. PMC. Web. Aug. 8, 2016.

Lundgren, H., "Bone Conduction Transducers and Output Variability, Lumped-Parameter Modelling of State Variables," Master of Science Thesis in Biomedical Engineering, Chalmers University of Technology, Göteborg, Sweden, 2010, Report No. EX0042/2010.

Taghavi, H. ; Håkansson, B. ; Reinfeldt, S. (2012) "Feedback Analysis in Percutaneous Bone-Conduction Device and Bone-Conduction Implant on a Dry Cranium". Otology and Neurotology, vol. 33(3), pp. 413-420.

\* cited by examiner

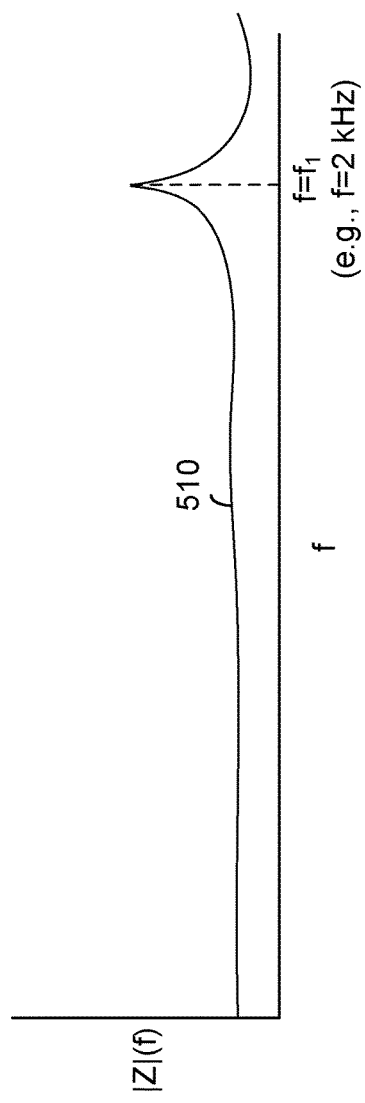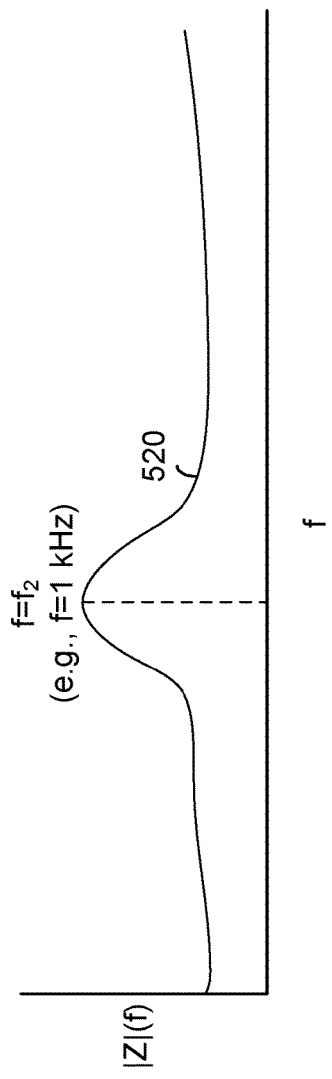

CLOSED LOOP AUDIO PROCESSING FOR BONE CONDUCTION TRANSDUCER

BACKGROUND

Unless otherwise indicated herein, the materials described in this section are not prior art to the claims in this application and are not admitted to be prior art by inclusion in this section.

Wearable computing devices (WCDs) such as head-mountable display devices, smart watches, body-worn health monitors, and smart headphones or headsets are becoming increasingly common. Users of such WCDs may wear the devices differently due to preferences in fit (e.g., snug or loose) or differing physical characteristics of the users (e.g., head size). Some performance aspects of WCDs and user comfort may be dependent on how the WCD is fitted when worn.

SUMMARY

Wearable computing devices and other types of wearable items may incorporate bone conduction transducers (BCTs) to provide audio to users. In some situations, a user may experience an unpleasant "tickling" sensation on the user's head when listening to audio content via a bone conduction transducer (BCT). The tickling sensation may occur when at least a portion of the audio content provided by the BCT has a frequency matching a user-influenced mechanical resonance frequency of the BCT. The resonance frequency of the BCT might vary from user to user based on preferences in fit and differences in head size, for example. This means that efforts to use "factory" audio processing settings to alleviate this problem might not be customized on a per-user basis. As a result, audio quality degradation caused by the factory audio processing settings may occur over a range of frequencies that is larger than what might otherwise be possible if user-specific audio processing settings were used. To help alleviate this problem, the WCD may sense (e.g., in real-time) the time-varying voltage and the time-varying current of the BCT input signal. The WCD may use this feedback (e.g., by determining the user-influenced resonance frequency of the BCT) to adjust audio processing parameters such as compression ratios, corner frequencies, and amplitude thresholds on a per-user basis. This may potentially result in a reduction or elimination of the tickling sensation, as well as better overall audio quality being provided to the user.

In one example, a method includes providing an input signal to a bone conduction transducer (BCT) of a wearable computing device (WCD). The input signal represents audio content. The method further includes sensing, by the WCD, a time-varying voltage of the input signal and a time-varying current of the input signal. The method further includes determining an operating mode based on the time-varying voltage and the time-varying current. The method further includes processing the audio content according to the determined operating mode and using the processed audio content to continue providing the input signal to the BCT.

In another example, a non-transitory computer readable medium stores instructions that, when executed by a wearable computing device (WCD), cause the WCD to perform functions. The functions include providing an input signal to a bone conduction transducer (BCT) of the WCD. The input signal represents audio content. The functions further include sensing a time-varying voltage of the input signal and a time-varying current of the input signal. The functions further include determining an operating mode based on the time-varying voltage and the time-varying current. The functions further include processing the audio content according to the determined operating mode and using the processed audio content to continue providing the input signal to the BCT.

In yet another example, a wearable computing device (WCD) includes one or more processors, a bone conduction transducer (BCT), and a non-transitory computer readable medium storing instructions that, when executed by the one or more processors, cause the WCD to perform functions. The functions include providing an input signal to the BCT. The input signal represents audio content. The functions further include sensing a time-varying voltage of the input signal and a time-varying current of the input signal. The functions further include determining an operating mode based on the time-varying voltage and the time-varying current. The functions further include processing the audio content according to the determined operating mode and using the processed audio content to continue providing the input signal to the BCT.

In yet another example, a wearable computing device (WCD) includes means for providing an input signal to a bone conduction transducer (BCT) of the WCD. The input signal represents audio content. The WCD further includes means for sensing a time-varying voltage of the input signal and means for sensing a time-varying current of the input signal. The WCD further includes means for determining an operating mode based on the time-varying voltage and the time-varying current. The WCD further includes means for processing the audio content according to the determined operating mode and means for using the processed audio content to continue providing the input signal to the BCT.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5A is a plot of input impedance with respect to input signal frequency for a BCT of an unworn WCD, according to an example embodiment.

FIG. 5B is a plot of input impedance with respect to input signal frequency for a BCT of a WCD that is worn by a user, according to an example embodiment.

DETAILED DESCRIPTION

Figure 1:
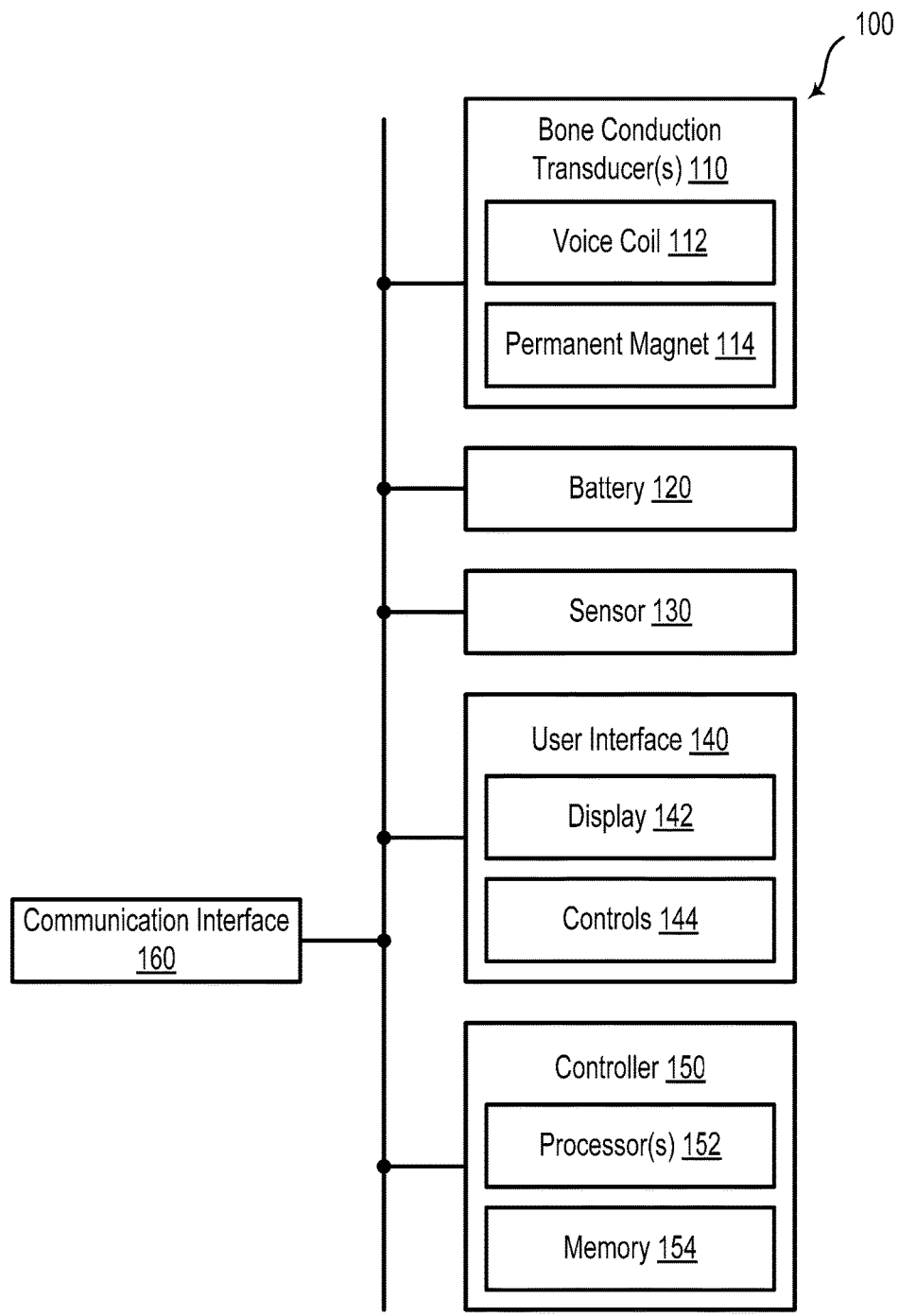
FIG. 1 is a schematic diagram of a wearable computing device (WCD), according to an example embodiment.

Example methods and systems are described herein. Any example implementation or feature described herein is not necessarily to be construed as preferred or advantageous over other implementations or features. The example implementations described herein are not meant to be limiting. Certain aspects of the disclosed methods and systems can be arranged and combined in a wide variety of different configurations, all of which are contemplated herein.

Furthermore, the particular arrangements shown in the Figures should not be viewed as limiting. It should be understood that other embodiments might include more or fewer of each element shown in a given Figure. Further, some of the illustrated elements may be combined or omitted. Yet further, an example embodiment may include elements that are not illustrated in the Figures.

A wearable computing device (WCD) may include at least one bone conduction transducer (BCT) configured to provide audio content to a user. A BCT may function by converting an input audio signal into mechanical vibrations of an anvil. The anvil may be placed against the user's temple, in front of or behind the user's ear(s), against another region of the user's head, or possibly against the user's chest or elbow, for example. These vibrations may be transmitted to the user's inner ear via bone or other tissue that lies between the anvil and the inner ear. Thus, a BCT may provide audio content directly to the user's inner ear, bypassing the user's outer and middle ear. Using a BCT may leave the user free to sense audio in the user's ambient environment via conventional hearing (e.g., vibrations transmitted through air).

In some situations, a user may experience an unpleasant vibration or "tickling" sensation on the user's skull when using the BCT. A BCT will generally have a mechanical resonance frequency (or a range of resonance frequencies) that is dependent on the stiffness of a spring of the BCT, the mass or size of the user's skull, the user's tissue density or skin thickness, and how tightly the BCT is fit upon the user's head, among other possible factors. At times, the audio content provided by the BCT may include frequency components that match the user-influenced mechanical resonance frequency of the BCT. At sufficient loudness, this may cause the BCT to undergo large spatial oscillations (e.g., excursion) against the user's skull, which may cause the unpleasant tickling sensation.

The WCD may be configured via a factory setting, for example, to compress an input signal provided to the BCT that would otherwise exceed a threshold amplitude within a range of frequencies (e.g., 700 Hz-1500 Hz) that is anticipated to include the resonance frequency of the BCT. Due to the actual resonance frequency of the BCT being dependent on user-specific factors, the range of frequencies over which compression occurs might be larger than the frequency range over which resonance actually occurs for a particular user (e.g., 800 Hz-1000 Hz). Furthermore, compression may compromise the quality of the audio provided by the BCT by changing the perceived loudness of the compressed frequencies relative to others.

To help alleviate this problem, the WCD may detect (e.g., in real-time) the time-varying voltage and the time-varying current of the BCT input signal. The WCD may use this feedback to identify the user-influenced resonance frequency of the BCT as the WCD is being worn by a particular user. This may allow compression ratios, corner frequencies, and amplitude thresholds to be customized and adjusted on a per-user basis. By customizing such audio processing parameters based on voltage and current feedback, degradation of audio quality may apply to a narrower band of frequencies and be less pronounced as compared to audio processing that occurs via a factory setting designed to encompass many or all conceivable user-dependent scenarios.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

FIG. 1 is a schematic diagram of a wearable computing device (WCD) 100, according to an example embodiment. The WCD 100 includes bone conduction transducer(s) (BCT) 110, a battery 120, a sensor 130, a user interface 140, and a controller 150.

The BCT 110 includes a voice coil 112 and a permanent magnet 114. The BCT 110 may be included as part of a hands-free headset or headphones. Alternatively, BCT 110 may be a bone-anchored hearing aid, an implantable bone conduction device, or another type of assistive listening device. In some embodiments, BCT 110 may include an underwater communication device or another type of listening device. Generally, BCT 110 may include a device operable to stimulate auditory sensations via one or more of distortional bone-conduction, inertial bone-conduction, or osseotympanic bone-conduction. As used herein, BCT 110 may refer to a single transducer (e.g., for mono listening), two transducers (e.g., for stereo listening), or more transducers. Furthermore, although the term "bone conduction" is used with respect to BCT 110, it is understood that BCT 110 may relate to a variety of transducers configured to convey sound fully or partially through contact with a body, through bone or other structures such as cartilage.

Voice coil 112 may include insulated wire, also known as magnet wire, wrapped in a simple coil or a toroid shape. In the case of a simple coil, the insulated wire may be wrapped around a cylindrical core that may include air, plastic, or a ferromagnetic material. In the case of a toroid shape, the insulated wire may be wrapped around a ring-shaped or donut-shaped core of plastic or ferromagnetic material. Other wire wrapping geometries are contemplated. In an example embodiment, voice coil 112 may include a turn radius of approximately 2 mm. Voice coil 112 may include copper wire with a phenolic resin (enamel) coating. For example, the coating may include a polyvinyl acetal-phenol aldehyde resin or other similar materials. Other types of electrically-insulating coatings are possible, such as polyimide, polyester, or polyvinyl formal. In an example embodiment, voice coil 112 may include wire having a diameter of about 90 microns (e.g., AWG 39 or SWG 43), however other wire thicknesses and corresponding wire gauges are contemplated.

Voice coil 112 may be considered an inductor, or a device configured to resist changes in electrical current passing through it. Voice coil 112 may include a characteristic inductance L, which is equivalent to the ratio of the voltage between input terminals of the voice coil 112 to the rate of change of current passing through the voice coil 112. The inductance of voice coil 112 may be expressed in units of a Henry (H).

In an example embodiment, the inductance of voice coil 112 may be greater than 1 milliHenry (mH) with a resistance of 8 ohms (a). As such, in some embodiments, voice coil 112 may generally have a larger inductance than other types of voice coils, such as those in speakers, earbuds, micro speakers, etc. Other inductance values are possible for voice coil 112.

Permanent magnet 114 may include one or more ferromagnetic materials such as iron, cobalt, nickel, rare earth metals, etc. In an example embodiment, permanent magnet 114 may include alnico, ferrite, or neodymium-iron-boron (NIB). Other magnetic materials are contemplated.

In an example embodiment, the inductance of voice coil 112 may be controlled by, for example, adjusting its position with respect to a pole piece and/or permanent magnet 114.

BCT 110 may include other elements, such as a yoke, a housing, an armature coupled to permanent magnet 114 and/or the housing, one or more springs or damping devices coupled to the armature and/or the housing, and electrical connections to voice coil 112.

Among other possibilities, battery 120 may include one or more of a nickel-cadmium (NiCd) cell, a nickel-zinc (NiZn) cell, a nickel metal hydride (NiMH) cell, or a lithium-ion (Li-ion) cell. Battery 120 may be operable to provide electrical power for BCT 110 and other elements of WCD 100. In an example embodiment, battery 120 may be electrically coupled to a battery charging circuit.

Sensor 130 may be configured to determine a state of, and/or a position of, WCD 100. As such, the sensor may include a proximity sensor or a Hall Effect sensor. Other types of sensors are contemplated.

User interface 140 may include a display 142 and controls 144. Display 142 may be configured to provide images to a user of WCD 100. In an example embodiment, display 142 may be at least partially see-through so that a user may view at least a portion of the environment by looking through display 142. In such a scenario, display 142 may provide images overlaid on the field of view of the environment. In some embodiments, display 142 may be configured to provide the user with an augmented reality or a virtual reality experience.

Controls 144 may include any combination of switches, buttons, touch-sensitive surfaces, and/or other user input devices. A user may monitor and/or adjust the operation of WCD 100 via controls 144. In an example embodiment, the controls 144 may be used to trigger one or more of the operations described herein.

WCD 100 may optionally include a communication interface 160 that may allow WCD 100 to communicate, using analog or digital modulation, with other devices, access networks, and/or transport networks. In some embodiments, the communication interface 160 may facilitate circuit-switched and/or packet-switched communication, such as plain old telephone service (POTS) communication and/or Internet protocol (IP) or other packetized communication. For instance, the communication interface 160 may include a chipset and antenna arranged for wireless communication with a radio access network or an access point. Also, the communication interface 160 may take the form of or include a wireline interface, such as an Ethernet, Universal Serial Bus (USB), or High-Definition Multimedia Interface (HDMI) port. The communication interface 160 may also take the form of or include a wireless interface, such as a Wifi, BLUETOOTH®, BLUETOOTH LOW ENERGY®, global positioning system (GPS), or a wide-area wireless interface (e.g., WiMAX or 3GPP Long-Term Evolution (LTE)). However, other forms of physical layer interfaces and other types of standard or proprietary communication protocols may be used over the communication interface 160. Furthermore, the communication interface 160 may include multiple physical communication interfaces 160 (e.g., a Wifi interface, a BLUETOOTH® interface, an NFC interface, and a wide-area wireless interface).

Controller 150 may include one or more processor(s) 152 and a memory 154, such as a non-transitory computer readable medium. Processor(s) 152 may include one or more general purpose processors—e.g., microprocessors—and/or one or more special purpose processors—e.g., image signal processors (ISPs), digital signal processors (DSPs), graphics processing units (GPUs), floating point units (FPUs), network processors, or application-specific integrated circuits (ASICs). In an example embodiment, controller 150 may include one or more audio signal processing devices or audio effects units. Such audio signal processing devices may process signals in analog and/or digital audio signal formats. Additionally or alternatively, processor(s) 152 may include at least one programmable in-circuit serial programming (ICSP) microcontroller. Memory 154 may include one or more volatile and/or non-volatile storage components, such as magnetic, optical, flash, or organic storage, and may be integrated in whole or in part with the processor(s) 152. Memory 154 may include removable and/or non-removable components.

Processor(s) 152 may be capable of executing program instructions (e.g., compiled or uncompiled program logic and/or machine code) stored in memory 154 to carry out the various functions described herein. Therefore, memory 154 may include a non-transitory computer-readable medium, having stored thereon program instructions that, upon execution by the processor(s) 152, cause the WCD 100 to carry out any of the methods, processes, or operations disclosed in this specification and/or the accompanying drawings. The execution of program instructions by processor(s) 152 may result in processor(s) 152 using data provided by various other elements of the WCD 100. In an example embodiment, the controller 150 may include a distributed computing network and/or a cloud computing network.

Figure 2:
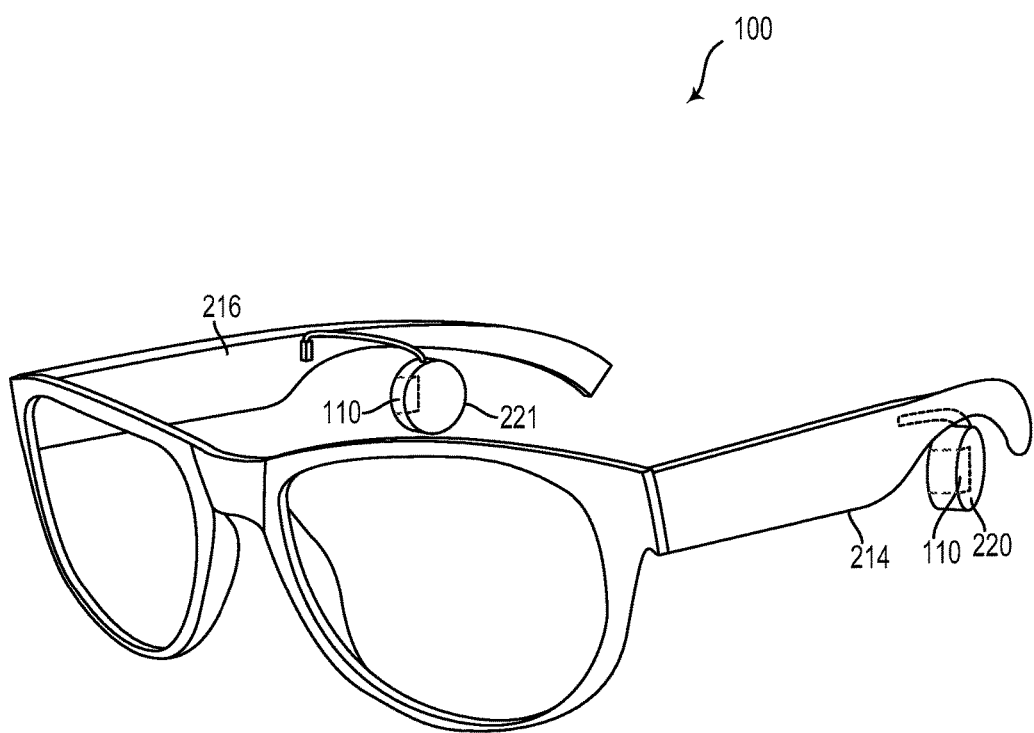
FIG. 2 illustrates a wearable computing device, according to an example embodiment.

FIG. 2 further illustrates the WCD 100, which may be shaped similarly to a pair of eyeglasses. In other examples, the WCD 100 might take on other physical forms that are configured to be worn upon a user's head. Components of the WCD 100 that are not explicitly shown in FIG. 2 might be internally integrated within the WCD 100 or simply might not be shown in FIG. 2 for the sake of simplicity.

Earpieces 220 and 221 may be attached to side-arms 214 and 216, respectively. Earpieces 220 and 221 may each include a BCT 110. The earpieces 220 and 221 may be arranged such that when the WCD 100 is worn, each BCT 110 is positioned to the posterior or anterior of a wearer's ear. Embodiments with a single earpiece and a single BCT are also possible.

In an exemplary embodiment, BCT(s) 110 may operate as a bone-conduction speaker. BCT(s) 110 may be, for example, a vibration transducer, an electro-acoustic transducer, or a variable reluctance transducer that produces sound in response to an electrical audio signal input. Generally, a BCT may be any structure that is operable to directly or indirectly vibrate the bone structure or pinnae of the user. For instance, a BCT may be implemented with a vibration transducer that is configured to receive an audio signal and to vibrate a wearer's bone structure or pinnae in accordance with the audio signal.

Figure 3:
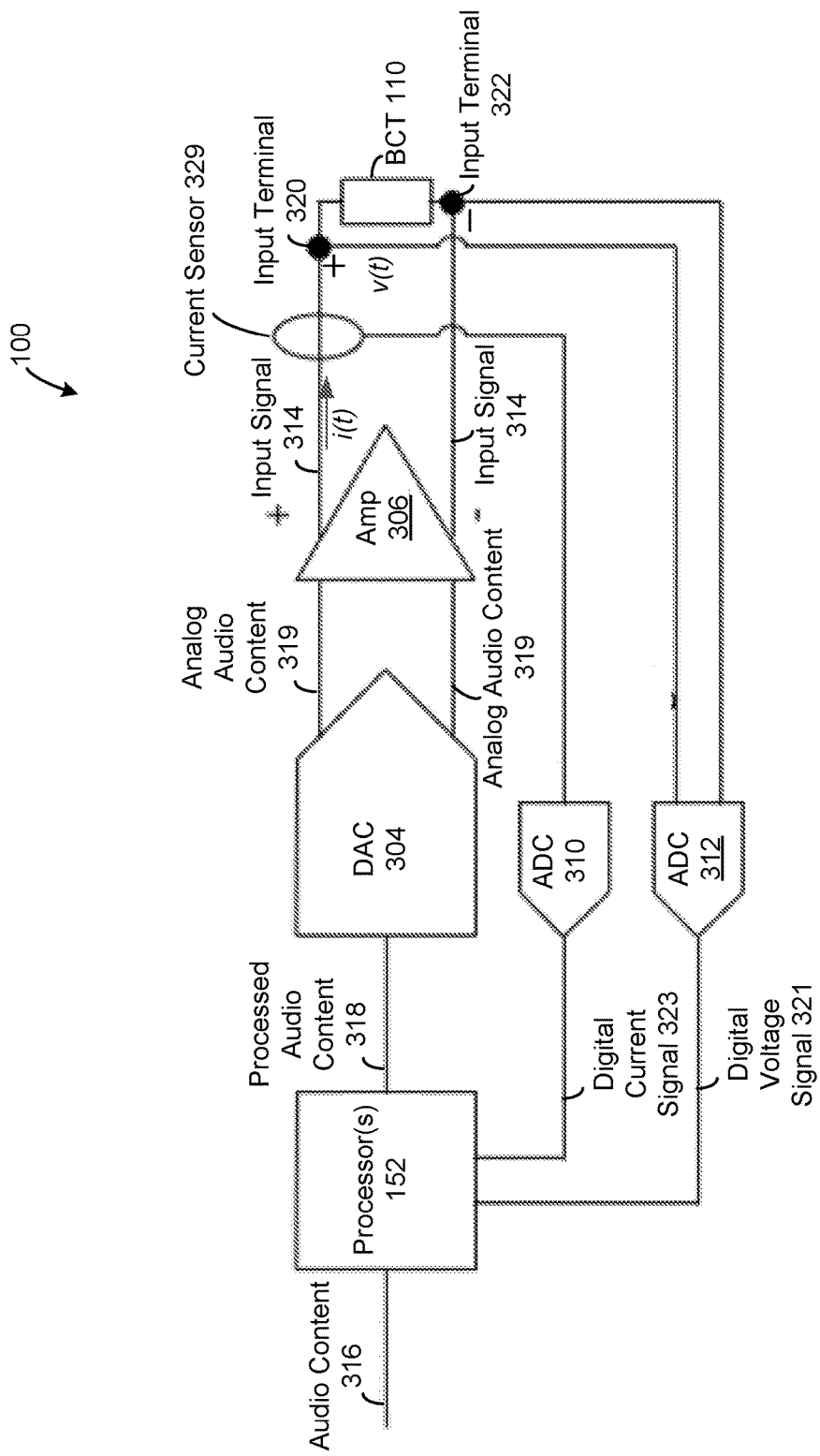
FIG. 3 is another schematic diagram of a wearable computing device, according to an example embodiment.

FIG. 3 is another schematic diagram of the WCD 100. As shown in FIG. 3, the WCD 100 may include a digital-to-analog converter (DAC) 304, an amplifier (Amp) 306, and analog-to-digital converters (ADCs) 310 and 312, in addition to what is depicted in FIGS. 1 and/or 2. One of skill in the art will understand that any of the components and respective functionalities described with respect to FIG. 3 may be implemented via more or fewer components than what is shown by FIG. 3.

The DAC 304 and the ADCs 310 and 312 are depicted in FIG. 3 as components that are separate from the processor(s)

152, but in other examples the DAC 304 and/or the ADCs 310 and 312 might be integrated with the processor(s) 152 or the amplifier 306. The amplifier 306 may take any form that is known in the art, but in FIG. 3 the amplifier 306 is shown as an amplifier that receives an analog input signal and generates an analog output signal.

Figure 4:
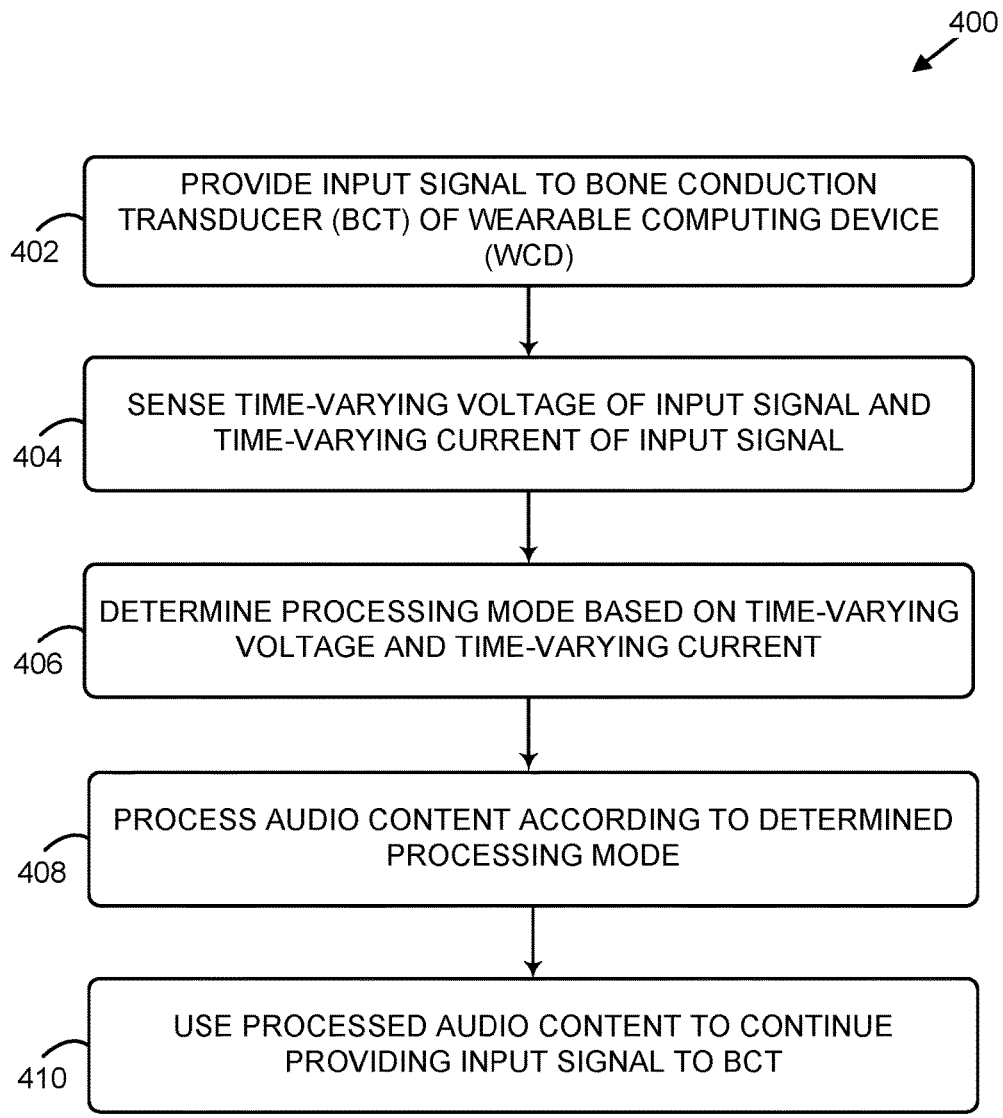
FIG. 4 is a block diagram that depicts a method, according to an example embodiment.

Method 400 depicted in FIG. 4 presents an example method that can be performed by the WCD 100. In other examples, the method 400 may be performed by any combination of one or more suitable components described herein. FIG. 4 may include one or more operations, functions, or actions as illustrated by one or more of blocks 402, 404, 406, 408, 410, and 412. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 400, and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in a process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache, or Random Access Memory (RAM). The computer readable medium may also include non-transitory media, such as secondary or persistent long term storage, like read-only memory (ROM), optical or magnetic disks, or compact-disc read-only memory (CD-ROM), for example. The computer readable media may also be any other volatile or non-volatile storage system. The computer readable medium may be considered a computer readable storage medium, a tangible storage device, or other article of manufacture, for example.

In addition, for the method 400, and other processes and methods disclosed herein, each block in FIG. 4 may represent circuitry that is wired to perform the specific logical functions in the process.

At block 402, the method 400 includes providing an input signal to a bone conduction transducer (BCT) of a wearable computing device (WCD). In some examples, this process may involve a number of steps. For instance, the processor (s) 152 may receive the audio content 316 for processing. The audio content 316 may be received via the communication interface 160 or from memory 154. The audio content 316 may be digital audio content that is processed by the processor(s) 152 to generate the processed audio content 318. The audio content 316 may include both frequencies that are generally audible to humans as well as frequencies that are generally inaudible to humans. Details regarding audio processing performed by the processor(s) 152 are discussed below.

The DAC 304 may receive the processed audio content 318, convert the processed audio content 318 into analog audio content 319, and provide the analog audio content 319 to the amplifier 306. In other examples, the amplifier 306 might not be included as part of the WCD 100. The amplifier 306 may amplify the analog audio content 319 according to a "flat" gain curve that is not frequency-dependent, but other examples are possible. That is, the amplifier 306 may amplify the analog audio content 319 to generate the input signal 314. The amplifier 306 may then provide the input signal 314 to the BCT 110. More specifically, the amplifier 306 may provide the input signal 314 at the input terminals 320 and 322 of the BCT 110.

At block 404, the method 400 includes sensing, by the WCD, a time-varying voltage of the input signal and a time-varying current of the input signal. The time-varying voltage may be sensed via a voltmeter (not shown) of the WCD 100, for instance. The ADC 312 may receive an analog voltage signal "v(t)" that is present between the input terminal 320 and the input terminal 322. The ADC 312 may generate a digital voltage signal 321 representing v(t), and the processor(s) 152 may analyze the digital voltage signal 321 (described below).

The WCD 100 may also include a current sensing resistor or a current mirror (depicted as current sensor 329) that is used to sense the time-varying current. The ADC 310 may receive an analog current signal "i(t)" that flows into the input terminal 320 and out of the input terminal 322. The ADC 310 may generate a digital current signal 323 representing i(t), and the processor(s) 152 may analyze the digital current signal 323 (described below).

At block 406, the method 400 includes determining an operating mode based on the time-varying voltage and the time-varying current. For example, the processor(s) 152 may divide the digital voltage signal 321 by the digital current signal 323 to obtain a time-varying impedance signal of the BCT 110. The processor(s) 152 may then perform a fast Fourier transform (FFT) of the time-varying impedance signal to obtain a frequency-dependent impedance function of the BCT 110. The impedance function Z(f) may be defined by two or more impedance values that correspond respectively to two or more frequency ranges of the audio content 316. The impedance function Z(f) might take the form of impedance curves 510 or 520 plotted in FIG. 5A or FIG. 5B, respectively.

In some examples, impedance curve 510 corresponds to a situation where the WCD 100 is not being worn by a user. On the other hand, impedance curve 520 may correspond to a situation where the WCD 100 is being worn by a user. As is shown by comparing impedance curves 510 and 520, the resonance frequency of the BCT 110 and the Q-factor of the resonance (discussed below) will generally both decrease when a user places the WCD 100 on the user's head.

In some situations, the WCD 100 might be configured to use closed-loop feedback to compensate for resonance of the BCT 110 even in situations where the WCD 100 is not being worn. Or, prior to initiating closed-loop feedback, the WCD 100 might utilize open-loop compression with a bandwidth that is wide enough to cover any conceivable resonance frequency that might be present for a WCD 100 that is being worn. This might prevent a situation where the wearer experiences the unpleasant tickling sensation before the WCD 100 can use signal feedback to customize a compression function for that particular scenario and/or user.

For the sake of further explanation, FIG. 5A could alternatively represent a scenario where the WCD 100 is being worn by a user. The processor(s) 152 may use the determined impedance function Z(f) (e.g., curve 510) to determine a user-influenced resonance frequency of the BCT 110. In such a situation, the WCD 100 may determine that the user-influenced resonance frequency of the BCT 110 is f=2 kHz, based on the curve 510 having a local or global maximum at f=2 kHz. Although not depicted by FIGS. 5A and 5B, the magnitude of Z(f) may actually be highest at frequencies that are greater than those at which the BCT 110 is expected to exhibit resonance, user-influenced or otherwise. For this reason, the WCD 100 might ignore such frequencies when determining an operating mode based on the input signal 314.

In such an example, the WCD 100 may determine corner frequencies for a compression function to be applied upon the audio content 316 by the processor(s) 152. In this context, "corner frequencies" may include a lower frequency boundary and an upper frequency boundary defining a frequency range to which a compression function is to be applied. The processor(s) 152 may determine the corner frequencies to be at 90% and 110% (100%+/−10%) of the determined resonance frequency, for example. If the resonance frequency is determined to be f=2 kHz, such corner frequencies would be 1.8 kHz and 2.2 kHz. In other examples, the determined corner frequencies may span more or less than +/−10% of the determined resonance frequency. In situations where enhanced audio quality is deemed to be more important than a slight risk of experiencing the unpleasant tickling sensation, the frequency range may be narrowed. In other situations, a slight risk of experiencing the unpleasant tickling sensation may outweigh concerns about audio quality, and the frequency range of the compression function may be widened. In addition to or instead of using compression techniques, the WCD 100 may use notch filtering to reduce the magnitude of the input signal 314 provided to the BCT 110 within a given frequency range.

In some examples, the processor(s) 152 may calculate a Q-factor (or a bandwidth) of the resonance of curve 510 or the resonance of curve 520. A Q-factor may be a dimensionless quantity that is inversely proportional to a bandwidth of the impedance peak (e.g., a bandwidth defined by full-width half maximum points on an impedance curve). By further example, the processor(s) 152 may assign a relatively narrow compression band to a BCT having an impedance function Z(f) with a relatively high Q-factor (e.g., curve 510), and a relatively wide compression band to a BCT having an impedance function Z(f) with a relatively low Q-factor (e.g., curve 520). Curve 510 has a larger Q-factor than the Q-factor of curve 520, as evidenced by the steeper peak at the resonance frequency of curve 510. For example, due to the relatively low Q-factor of the curve 520, the processor(s) 152 may determine the corner frequencies of the compression function to be at 80% and 120% (100%+/−20%) of the resonance frequency, or 800 Hz and 1.2 kHz for the BCT represented by curve 520.

Figure 6:
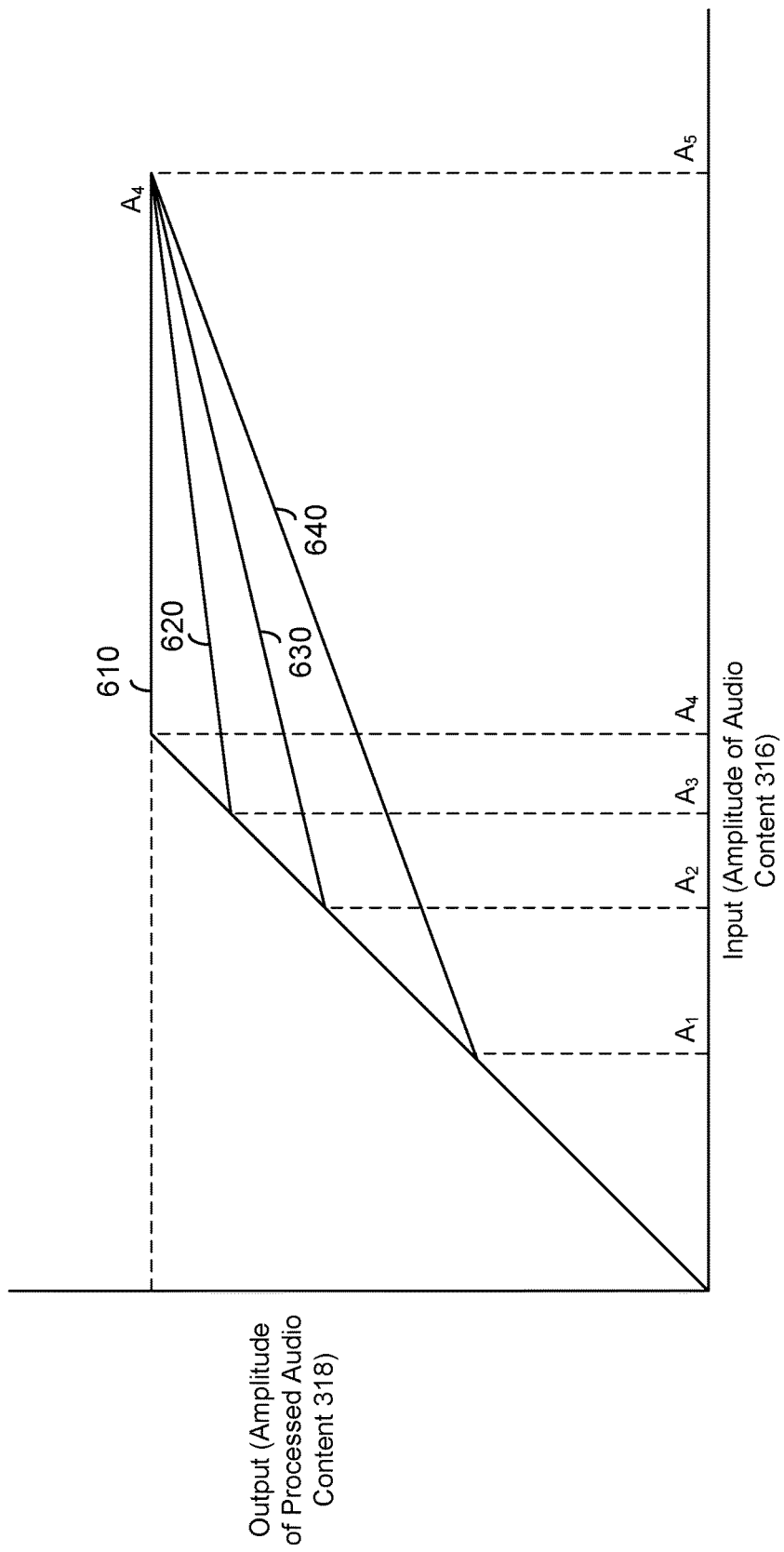
FIG. 6 is a plot of several example audio compression curves, according to an example embodiment.

The processor(s) 152 may also determine one or more amplitude thresholds for the compression function that is to be applied to the audio content 316 by the processor(s) 152. For example, FIG. 6 depicts four potential compression curves 610, 620, 630, and 640. For the discussion below it can be assumed that the amplitude scale of the horizontal axis of FIG. 6 is equal to the amplitude scale of the vertical axis of FIG. 6.

In some cases, the unpleasant tickling sensation might be prevented if the amplitude of the processed audio content 318 is limited at or below $A_4$ within the bandwidth of the compression function. This could be implemented in a number of ways. For example, curve 610 depicts a 1:1 amplitude ratio between the audio content 316 and the processed audio content 318 for amplitudes less than $A_4$. When the amplitude of the audio content 316 exceeds $A_4$ within the compression bandwidth and compression curve 610 is applied, the processor(s) 152 may generate processed audio content 318 having an amplitude that is equal to $A_4$.

Curve 620 depicts a 1:1 amplitude ratio between the audio content 316 and the processed audio content 318 for amplitudes less than $A_3$. When the amplitude of the audio content 316 exceeds $A_3$ within the compression bandwidth and compression curve 620 is applied, the processor(s) 152 may generate processed audio content 318 having an amplitude that is compressed according to a first compression ratio.

Curve 630 depicts a 1:1 amplitude ratio between the audio content 316 and the processed audio content 318 for amplitudes less than $A_2$. When the amplitude of the audio content 316 exceeds $A_2$ within the compression bandwidth and compression curve 630 is applied, the processor(s) 152 may generate processed audio content 318 having an amplitude that is compressed according to a second compression ratio. The second compression ratio may be less than the first compression ratio of curve 620.

Curve 640 depicts a 1:1 amplitude ratio between the audio content 316 and the processed audio content 318 for amplitudes less than $A_1$. When the amplitude of the audio content 316 exceeds $A_1$ within the compression bandwidth and compression curve 640 is applied, the processor(s) 152 may generate processed audio content 318 having an amplitude that is compressed according to a third compression ratio. The third compression ratio may be less than the second compression ratio of curve 630.

At block 408, the method 400 includes processing the audio content according to the determined operating mode. For example, the processor(s) 152 may process the audio content 316 according to the operating mode determined at block 406. The determined operating mode may include parameters such as amplitude thresholds, compression bandwidth and/or corner frequencies, and the compression ratios discussed above. The processor(s) 152 may use these parameters to generate the processed audio content 318.

At block 410, the method 400 includes using the processed audio content to continue providing the input signal to the BCT. The WCD 100 may provide the input signal 314 to the BCT 110 in any manner discussed above. However, the input signal 314 provided to the BCT 110 at block 410 may reflect processing performed by the processor(s) 152 with processing parameters that are updated from time to time (e.g., continuously and/or periodically) using the closed-loop voltage and current feedback discussed above.

In some examples, the WCD 100 might use voltage and current feedback to determine whether the WCD 100 is being worn with a proper fit by the user. For example, the WCD 100 may obtain an impedance curve of the BCT 110 while the WCD 100 is being worn using methods described above and identify the resonance frequency and/or Q-factor of the obtained impedance curve. Next, the WCD 100 may determine whether the identified resonance frequency and/or identified Q-factor corresponds to a known frequency range and/or a known Q-factor that is indicative of the WCD 100 being worn with a proper fit. In some examples, a "proper fit" might mean that a frame of the WCD 100 has a desired amount of tension and/or the BCT 110 is fit against the user's skull with a tension force that conforms to design expectations.

In other examples, the WCD 100 might receive input via a user interface indicating that the user considers the current fit of the WCD 100 desirable. In this case, the WCD 100 may provide a notification via the user interface if the WCD 100 determines that the fit of the WCD 100 has drifted substantially from the fit considered by the user to be desirable. For example, the WCD 100 may determine that the resonance frequency of the BCT 110 has drifted substantially (e.g., +1-10%) from a resonance frequency corresponding to the desired fit. In response, the WCD 100 may provide, via the user interface, an indication that the fit has become improper.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A method comprising:
   providing an input signal to a bone conduction transducer (BCT) of a wearable computing device (WCD), wherein the input signal represents audio content;
   sensing, by the WCD, a time-varying voltage of the input signal and a time-varying current of the input signal;
   determining an operating mode based on the time-varying voltage and the time-varying current;
   processing the audio content according to the determined operating mode; and
   using the processed audio content to continue providing the input signal to the BCT.

2. The method of claim 1, further comprising:
   using the time-varying voltage and the time-varying current to determine that the WCD is being worn with an improper fit; and
   providing an indication of the improper fit via a user interface.

3. The method of claim 1, wherein the input signal is an analog input signal, wherein the audio content is digital audio content, and wherein providing the input signal to the BCT comprises:
   converting the digital audio content into the analog input signal.

4. The method of claim 1, wherein the time-varying voltage is a voltage between a first input terminal of the BCT and a second input terminal of the BCT.

5. The method of claim 1, wherein the time-varying current is a current that flows into a first input terminal of the BCT and out of a second input terminal of the BCT.

6. The method of claim 1, further comprising:
   using the time-varying voltage and the time-varying current to determine a resonance frequency of the BCT,
   wherein the operating mode is determined based on the determined resonance frequency.

7. The method of claim 6, wherein processing the audio content comprises compressing a portion of the audio content that corresponds to a frequency range that includes the determined resonance frequency.

8. The method of claim 1, further comprising:
   using the time-varying voltage and the time-varying current to determine two or more input impedances of the BCT that correspond respectively to two or more frequency ranges of the audio content,
   wherein the operating mode is determined based on the two or more determined input impedances.

9. The method of claim 8, further comprising:
   using the determined input impedances to determine a resonance frequency of the BCT,
   wherein the operating mode is determined based on the determined resonance frequency.

10. The method of claim 9, further comprising:
    identifying a maximum input impedance of the determined input impedances,
    wherein the resonance frequency is determined by identifying a frequency that corresponds to the maximum input impedance.

11. The method of claim 8, further comprising:
    using the determined input impedances to determine a Q-factor of the BCT or a resonance bandwidth of the BCT,
    wherein the operating mode is determined based on the determined Q-factor or the determined resonance bandwidth.

12. The method of claim 1,
    wherein determining the operating mode comprises determining an amplitude threshold corresponding to a particular frequency range of the audio content, and
    wherein processing the audio content comprises compressing a portion of the audio content that (a) has an amplitude that exceeds the amplitude threshold and (b) corresponds to the particular frequency range.

13. The method of claim 1,
    wherein determining the operating mode comprises determining a particular frequency range, and
    wherein processing the audio content comprises compressing a portion of the audio content that corresponds to the particular frequency range.

14. The method of claim 1,
    wherein determining the operating mode comprises determining a compression ratio corresponding to a particular frequency range of the audio content, and
    wherein processing the audio content comprises compressing a portion of the audio content that corresponds to the particular frequency range according to the determined compression ratio.

15. A non-transitory computer readable medium storing instructions that, when executed by a wearable computing device (WCD), cause the WCD to perform functions comprising:
    providing an input signal to a bone conduction transducer (BCT) of the WCD, wherein the input signal represents audio content;
    sensing a time-varying voltage of the input signal and a time-varying current of the input signal;
    determining an operating mode based on the time-varying voltage and the time-varying current;
    processing the audio content according to the determined operating mode; and
    using the processed audio content to continue providing the input signal to the BCT.

16. The non-transitory computer readable medium of claim 15,
    wherein determining the operating mode comprises determining a particular frequency range, and
    wherein processing the audio content comprises compressing a portion of the audio content that corresponds to the particular frequency range.

17. The non-transitory computer readable medium of claim 15,
    wherein determining the operating mode comprises determining a compression ratio corresponding to a particular frequency range of the audio content, and
    wherein processing the audio content comprises compressing a portion of the audio content that corresponds to the particular frequency range according to the determined compression ratio.

18. A wearable computing device (WCD) comprising:
one or more processors;
a bone conduction transducer (BCT); and
a non-transitory computer readable medium storing instructions that, when executed by the one or more processors, cause the WCD to perform functions comprising:
    providing an input signal to the BCT, wherein the input signal represents audio content;
    sensing a time-varying voltage of the input signal and a time-varying current of the input signal;
    determining an operating mode based on the time-varying voltage and the time-varying current;
    processing the audio content according to the determined operating mode; and
    using the processed audio content to continue providing the input signal to the BCT.

19. The WCD of claim 18, the functions further comprising:
    using the time-varying voltage and the time-varying current to determine two or more input impedances of the BCT that correspond respectively to two or more frequency ranges of the audio content,
    wherein the operating mode is determined based on the two or more determined input impedances.

20. The WCD of claim 18,
    wherein determining the operating mode comprises determining a particular frequency range, and
    wherein processing the audio content comprises compressing a portion of the audio content that corresponds to the particular frequency range.

* * * * *